United States Patent
Bouadi et al.

(10) Patent No.: US 12,182,091 B2
(45) Date of Patent: Dec. 31, 2024

(54) SEMANTIC VECTORIZATION FOR FEATURE ENGINEERING

(71) Applicant: SAP SE, Walldorf (DE)

(72) Inventors: Mohamed Bouadi, La Garenne-Colombes (FR); Arta Alavi, Andresy (FR); Salima Benbernou, Colombes (FR); Mourad Ouziri, Gennevilliers (FR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/168,982

(22) Filed: Feb. 14, 2023

(65) Prior Publication Data

US 2024/0220467 A1 Jul. 4, 2024

Related U.S. Application Data

(60) Provisional application No. 63/436,256, filed on Dec. 30, 2022.

(51) Int. Cl.
 *G06F 16/22* (2019.01)
 *G06N 3/092* (2023.01)
(52) U.S. Cl.
 CPC .......... *G06F 16/221* (2019.01); *G06N 3/092* (2023.01)
(58) Field of Classification Search
 None
 See application file for complete search history.

(56) References Cited

U.S. PATENT DOCUMENTS

| | | | | |
|---|---|---|---|---|
| 11,531,675 | B1 * | 12/2022 | Raghavan | G06F 16/248 |
| 11,797,549 | B2 * | 10/2023 | Raghavan | G06F 16/2255 |
| 2023/0076308 | A1 * | 3/2023 | Raghavan | G06N 5/01 |
| 2023/0273911 | A1 * | 8/2023 | Dong | G06F 16/2237 |
| | | | | 707/741 |
| 2023/0316147 | A1 * | 10/2023 | Dias Barata | G06N 20/00 |
| | | | | 706/12 |
| 2023/0350647 | A1 * | 11/2023 | Hasebe | G06F 8/34 |
| 2024/0062568 | A1 * | 2/2024 | Khan | G06V 30/413 |
| 2024/0220467 | A1 * | 7/2024 | Bouadi | G06N 3/092 |
| 2024/0220793 | A1 * | 7/2024 | Bouadi | G06N 3/045 |

OTHER PUBLICATIONS

Mnih, Volodymry et al., "Playing Atari with Deep Reinforcement Learning", Machine Learning, arXiv:1312.5602v1 [cs.LG], Dec. 19, 2013, (pp. 1-9, 9 total pages).

Lam, Hoang Thanh et al., "One button machine for automating feature engineering in relational databases", arXiv:1706.00327v1 [cs.DB], Jun. 1, 2017, DOI: 10.48550/arXiv.1706.00327, 9pgs.

(Continued)

*Primary Examiner* — Kim T Nguyen
(74) *Attorney, Agent, or Firm* — Buckley, Maschoff & Talwalkar LLC

(57) ABSTRACT

Systems and methods include determination of a plurality of features, determination, for each of the plurality of features, of a feature vector based on a taxonomy of logical entities, combination of the determined feature vectors into a composite feature vector, determination of an operator based on the composite feature vector, and determination of a new feature based on the operator.

15 Claims, 16 Drawing Sheets

(56) References Cited

OTHER PUBLICATIONS

Roderick, Melrose et al., "Implementing the Deep Q-Network", 30th Conference on Neural Information Processing Systems (NIPS 2016), arXiv.1711.07478v1 [cs.LG], DOI: 10.48550/arXiv.1711.07478, Nov. 20, 2017, 9pgs.

Khurana, Udayan et al., "Automating Predictive Modeling Process using Reinforcement Learning", arXiv:1903.00743v1 [cs.LG], Mar. 2, 2019, 8pgs.

Shi, Qitao et al., "SAFE: Scalable Automatic Feature Engineering Framework for Industrial Tasks", Computer Science Machine Learning, arXiv:2003.02556v3 [cs.LG], Mar. 9, 2020, 12pgs.

Khurana, Udayan et al., "Feature Engineering for Predictive Modeling Using Reinforcement Learning", The Thirty-Second AAAI Conference on Artificial Intelligence (AAA1-18), (pp. 3407-3414, 8 total pages.).

Phani, Arnab et al., "UPLIFT: Parallelization Strategies for Feature Transformations in Machine Learning Workloads", Proceedings of the VLDB Endowment, vol. 15, No. 11, ISSN 2150-8097, DOI:10.14778/3551793.3551842, (pp. 2929-2938, 10 total pages).

Chen, Xiangning et al., "Neural Feature Search: A Neural Architecture for Automated Feature Engineering", 2019 IEEE International Conference on Data Mining (ICDM), DOI 10.1109/ICDM.2019.00017, 2019, (pp. 71-80, 10 total pages).

Kanter, James Max et al., "Deep Feature Synthesis: Towards Automating Data Science Endeavors", 2015 IEEE International Conference on Data Science and Advanced Analytics (DSAA), 2015, 10pgs.

Khurana, Udayan et al., "Cognito: Automated Feature Engineering for Supervised Learning", 2016 IEEE 16th International Conference on Data Mining Workshops, DOI 10.1109/ICDMW.2016.179, 2016, (pp. 1304-1307, 4 total pages).

Wang, Jiayi et al., "Coresets over Multiple Tables for Feature-rich and Data-efficient Machine Learning", Proceedings of the VLDB Endowment, vol. 16, No. 1 ISSN 2150-8097, DOI: 10.14778/3561261.3561267, (pp. 64-76, 13 total pages).

Zhang, Jianyu et al., "Automatic Feature Engineering by Deep Reinforcement Learning", Proc. of the 18th International Conference on Autonomous Agents and Multiagent Systems (AAMAS 2019), May 13-17, 2019, Montreal, Canada, (pp. 2312-2314, 3 total pages).

Shearer, Rob et al., "HermiT: A Highly-Efficient OWL Reasoner", OWL: Experiences and Directions Computer Science, 2008, 10pgs.

* cited by examiner

| 650 | 600 |
|---|---|
| 1 | Object |
| 0 | Integer |
| 0 | Float |
| 1 | Date |
| 0 | Categorical |
| 0 | Id |
| 0 | Quantity |
| ⋮ | ⋮ |
| 0 | Speed |
| 0 | Distance |
| 0 | Price |
| 0 | Unit Price |
| 0 | Selling price |
| 0 | Purchase price |
| 0 | Revenue |
| ⋮ | ⋮ |
| 1 | Date |
| 0 | Date of Birth |
| 1 | Transaction Date |
| 0 | Account creation date |
| ⋮ | ⋮ |
| 0 | Age |
| 0 | Gender |
| ⋮ | ⋮ |
| 0 | Currency |
| 0 | SpeedUnit |
| ⋮ | ⋮ |

*FIG. 6*

SEMANTIC VECTORIZATION FOR FEATURE ENGINEERING

CROSS-REFERENCE TO RELATED APPLICATIONS

The present application claims priority to U.S. Provisional Patent Application Ser. No. 63/436,256, filed Dec. 30, 2022, the contents of which are incorporated herein by reference for all purposes.

BACKGROUND

Organizations have long employed computing systems to manage and store operational data. The volume of such data has grown exponentially over time, resulting in continuous development of new and more-efficient systems for handling such data. Systems to facilitate understanding and analysis of large data sets have similarly evolved.

Over the past decade, organizations have increasingly used modeling applications to predict future events based on stored data. These applications have been used to solve difficult problems and uncover new opportunities across a variety of domains. A modeling application typically provides tools for defining and training a machine learning (ML) algorithm which infers a desired output based on specified known inputs.

Unfortunately, defining and training an ML algorithm using existing tools is quite difficult for non-experts in the field. Generally, it is required to gather suitable training data, define model inputs (i.e., feature selection) from the training data, select a model architecture, train the model, and deploy the model. Each of the foregoing steps is replete with corresponding decisions and uncertainties.

For example, the goal of feature selection is to select features which result in an efficient and accurate ML algorithm. The performance of a particular set of features may be validated by prior knowledge or by tests using synthetic and/or actual data sets. However, selecting an optimal set of features presents an intractable computational problem.

In particular, the number of possible features that can be constructed is unlimited. Moreover, transformations can be composed and applied recursively to the features generated by previous transformations. In order to confirm whether a newly-composed feature is relevant, a new model including the feature is trained and evaluated. This validation is costly and impractical to perform for each newly-constructed feature.

In view of the foregoing, feature selection (i.e., feature engineering) is primarily performed manually by a data scientist. The data scientist uses intuition, a background in data mining and statistics, and domain knowledge to extract useful features from stored data, and to refine the features through trial and error by training corresponding models and observing their relative performance.

Existing feature selection algorithms attempt to automate portions of the feature engineering process using a search framework or a correlation model. Improved automation of the feature engineering process to enable faster and better decision-making at a reduced cost is desired.

BRIEF DESCRIPTION OF THE DRAWINGS

FIG. 6 illustrates a portion of a flattened taxonomy mapped to a feature vector according to some embodiments.

DETAILED DESCRIPTION

The following description is provided to enable any person in the art to make and use the described embodiments. Various modifications, however, will be readily-apparent to those in the art.

Some embodiments relate to generating a fixed-size composite feature vector which represents any number of input features, where each feature is represented by a same-sized feature vector. A feature vector representing a given feature may be generated based on a taxonomic graph specifying logical concepts known to domain experts.

Embodiments may further relate to automating portions of feature engineering using an autonomous agent that determines features iteratively using a fixed-size input layer. According to some embodiments, the fixed-size input layer receives the above-described fixed-size composite feature vector. The agent may comprise a deep reinforcement learning network which determines, based on intermediate rewards, a set of features which maximizes a long-term (i.e., cumulative) reward. The long-term reward may represent a performance of a machine learning model trained based on the determined set of features.

Figure 1:
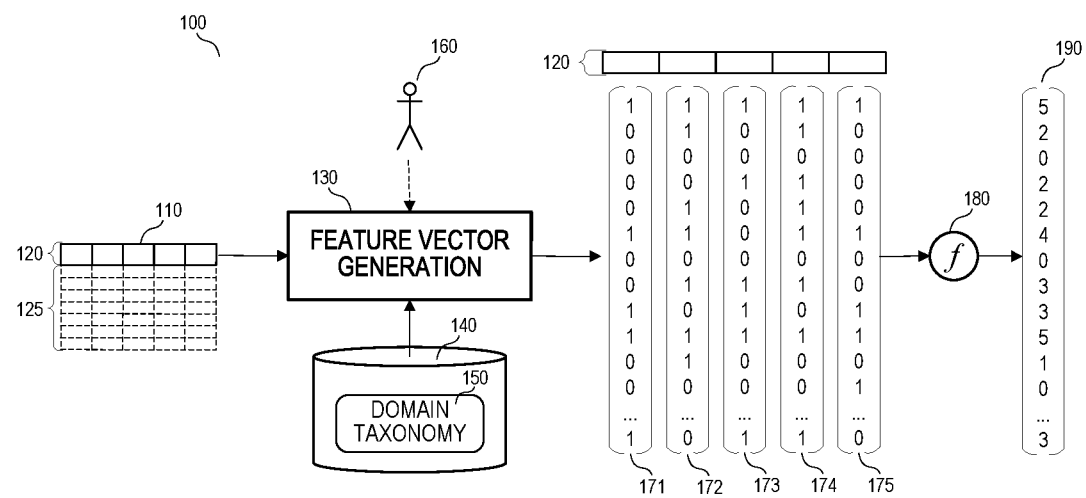
FIG. 1 is a block diagram of an architecture to generate a fixed-size composite feature vector representing a plurality of features according to some embodiments.

FIG. 1 is a block diagram of architecture 100 to generate a fixed-size composite feature vector representing a plurality of features according to some embodiments. All components illustrated herein may be implemented using any suitable combination of computing hardware and/or software that is or becomes known. In some embodiments, two or more components are implemented by a single computing device or may be co-located. One or more components may be implemented as a cloud service (e.g., Software-as-a-Service, Platform-as-a-Service). A cloud-based implementation of any components may apportion computing resources elastically according to demand, need, price, and/or any other metric.

Database table 110 may comprise any set of data values that is or becomes known. Table 110 includes five columns of data 125, where each column includes data values corresponding to one of five features 120. In some embodiments, table 110 includes columns in addition to those associated with features 120. According to some embodiments, features 120 are referred to as "raw" features because the data values associated therewith are identical to the data values of the corresponding columns of table 110. As will be described below, features may be generated based on one or more raw features. The data values associated with such raw features are not natively stored in table 110 but are instead generated from the native data values.

According to the present example, features 120 are input to feature vector generation component. For example, text names associated with each feature 120 are input to feature vector generation component 130. The text names may be identical to the column names of the columns of table 110 associated with each feature 120. Feature vector generation component 130 operates to generate a feature vector for each of the input features.

In particular, and according to some embodiments, feature vector generation component 130 accesses domain taxonomy 150 stored in data store 140 to generate a feature vector corresponding to each field. As will be described in detail below, domain taxonomy 150 is a taxonomic knowledge graph defining a hierarchy of n logical entities. A feature vector of size 1×n is also defined which includes an entry for each logical entity of taxonomy 150. The feature vector therefore represents a flattened version of the hierarchy of n logical entities.

According to some embodiments, feature vector generation component 130 identifies, for each feature 120, those logical entities of taxonomy 150 of which the feature is a member and assigns a value of 1 to the entries of the feature vector which correspond to the identified logical entities. A feature 120 may be named identically to a logical entity of taxonomy 150, in which case the entries of the feature vector associated with the logical entity and with all parent logical entities may be set to 1.

Feature vector generation component 130 may utilize direct and/or fuzzy mappings from text names of features to logical entities in order to generate feature vectors in which the appropriate entries are set to 1 or 0. According to some embodiments, and as indicated by a dashed arrow, one or more users 160 may assist the generation of feature vectors for one or more of features 120. For example, a user 160 may determine that a feature 120 is a member of a logical entity of taxonomy 150 and may issue an instruction to feature vector generation component 130 to set the entry of the feature's feature vector which corresponds to the logical entity to 1.

As shown, feature vector generation component 130 outputs feature vectors 171-175, wherein each of feature vectors 171-175 has been generated based on a respective one of features 120. Each respective entry (i.e., the first, second, third, etc. entries) of each of feature vectors 171-175 corresponds to a same logical entity of taxonomy 150 and each of feature vectors 171-175 is therefore of the same size.

Function 180 is applied to feature vectors 171-175 to generate composite feature vector 190. According to the illustrated example, function 180 is a summing function which sums respective entries of feature vectors 171-175. For example, the first entry of vector 190 is equal to the sum of the first entries of feature vectors 171-175, the second entry of vector 190 is equal to the sum of the second entries of feature vectors 171-175, etc. Embodiments are not limited to a summing function.

Advantageously, composite feature vector 190 represents each of features 120 in a semantically-relevant manner. In particular, composite feature vector 190 is generated based on the semantics of each of features 120, as defined by domain taxonomy 150. Feature generation systems may therefore utilize vector 190 as a proxy for features 120. Non-exhaustive examples of such utilization will be described below.

Figure 2A:
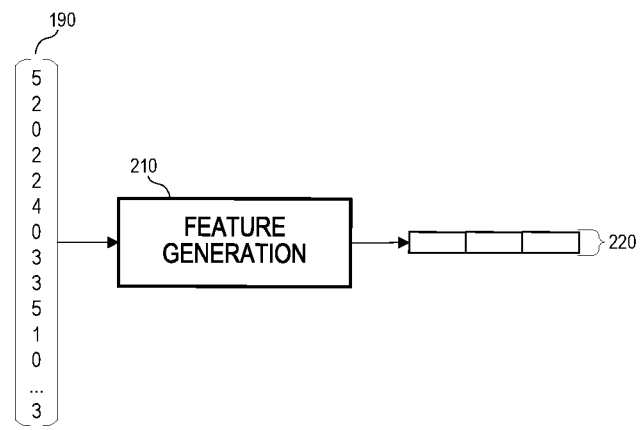
FIG. 2A illustrates generation of a plurality of features based on a composite feature vector according to some embodiments.

According to one such example, FIG. 2A illustrates generation of a plurality of features based on a composite feature vector according to some embodiments. Composite feature vector 190 is received by feature generation system 210. Feature generation system 210 operates to generate three new features 220 based on composite feature vector 190. Feature generation system 210 may comprise any suitable system for generating one or more features based on a received feature vector. Examples of a feature generation system according to some embodiments are provided below.

Figure 2B:
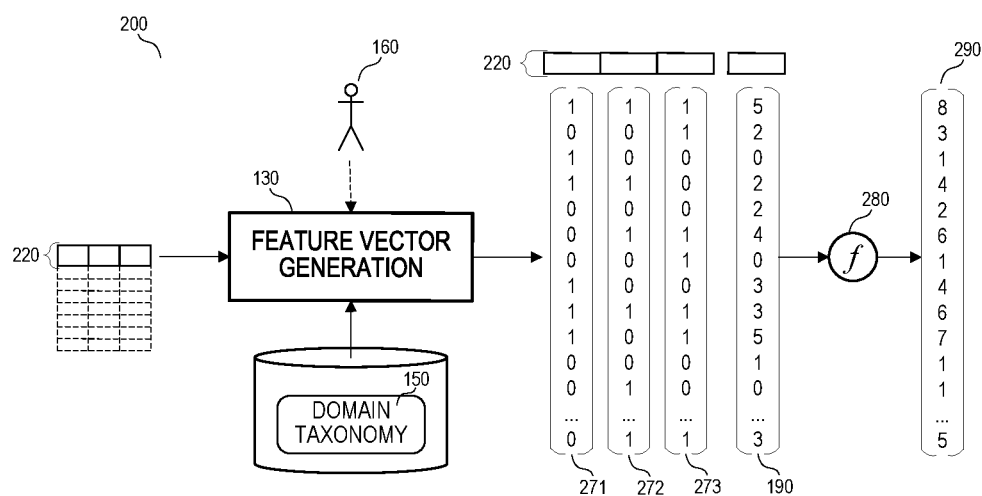
FIG. 2B illustrates generation of a new fixed-size composite feature vector based on a plurality of features and on a composite feature vector according to some embodiments.

FIG. 2B illustrates generation of a new fixed-size composite feature vector based on a plurality of features and on a composite feature vector according to some embodiments. FIG. 2B shows new features 220 generated by feature generation system 210. As described with respect to raw features 120, each of features 220 is associated with a column of data values.

The data values associated with each of features 220 are determined based on data values associated with one or more raw features 120. For example, one of features 220 may comprise a sum (e.g., a+b) of two of raw features 120 (e.g., a, b). Accordingly, the data value of each row of the one feature 220 consists of the sum of the data values of the same row of the two raw features.

Features 220 are input to feature vector generation component 130. As described with respect to FIG. 1, feature vector generation component 130 uses taxonomy 150 and potential input from user 160 to generate a feature vector (271, 272, 273) for each of features 220. Each respective entry of each of feature vectors 271, 272, 273 and composite feature vector 190 corresponds to a same logical entity of taxonomy 150. Each of feature vectors 271, 272, 273 and 190 is of the same size.

Function 280 is applied to feature vectors 271, 272, 273 and 190 to generate new composite feature vector 290. Function 280 may comprise a summing function as described above but embodiments are not limited thereto. Since composite feature vector 190 represents each of features 120 and feature vectors 271, 272, 273 represent each of features 220, new composite feature vector 290 can be considered as representing each of features 120 and 220 in a semantically-relevant manner. Advantageously, and despite the fact that composite feature vector 190 represents five features and composite feature vector 290 represents eight features, composite feature vector 190 and composite feature vector 290 are of the same size. Accordingly, the input size of a feature generation system utilizing such composite feature vectors need not change regardless of how many features are represented by an input composite feature vector.

Figure 3:
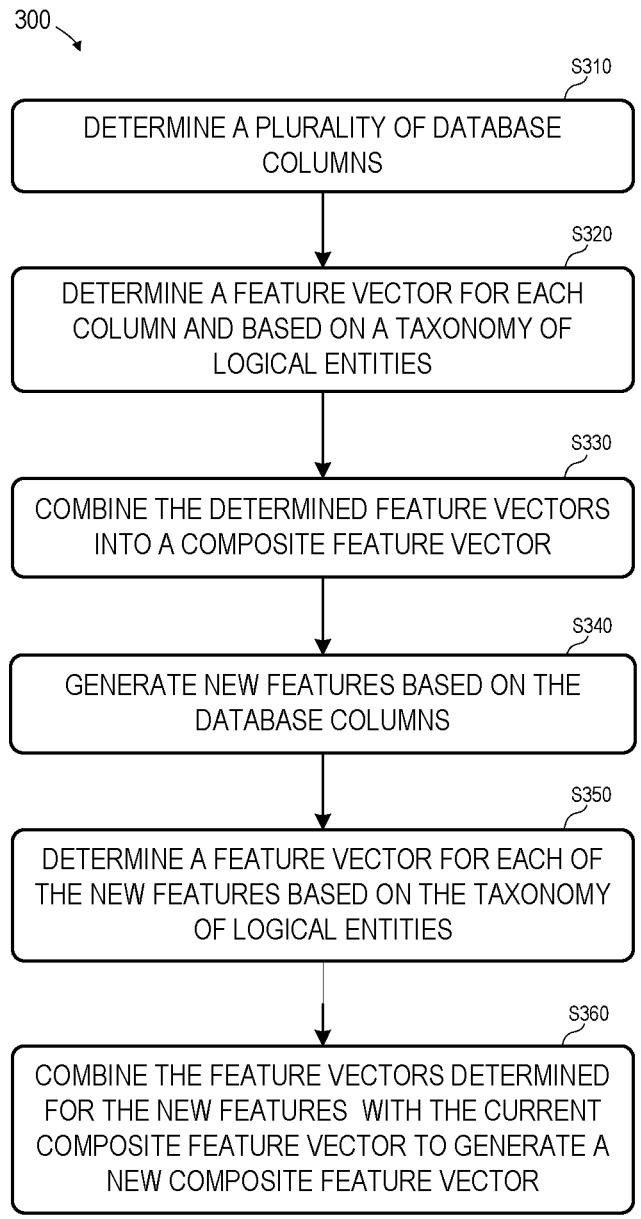
FIG. 3 is a flow diagram of a process to generate a fixed-size composite feature vector based on successively-generated features according to some embodiments.

FIG. 3 comprises a flow diagram of process 300 to generate composite feature vectors representing a plurality of features according to some embodiments. Process 300 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any one or more processing units, including but not limited to a microprocessor, a microprocessor core, and a microprocessor thread. Embodiments are not limited to the examples described below.

Initially, a plurality of database columns are determined at S310. The plurality of database columns may raw features from which a set of features is to be determined. The determined set of features is to be used to train a machine learning model to infer an output value as is known in the art. The plurality of database columns may belong to one or more database tables. It is assumed that each column includes rows of data values conforming to metadata defining the column (e.g., column name, data type).

At S320, a feature vector is determined for each column based on a taxonomy of logical entities. The taxonomy may comprise a taxonomic knowledge base in which information about concepts and features is stored in an RDF representation (e.g., as entity-relationship-entity triples). The knowledge base includes ontological components that formalize information in terms of classes, binary relations and individuals (i.e., "facts"). The knowledge base may be considered a directed knowledge graph in which entities are organized into class-subclass hierarchies based on an isA (i.e., subClass), memberOf and hasUnit relationships.

Logical entities of the taxonomy may include generic concepts that are found in datasets (e.g., numerical features, categorical features, dates). The logical entities may be developed in view of the data schema to which the determined plurality of columns belong. In one example, the plurality of database columns belong to a table within a human resource management database application, and the taxonomy includes logical entities specific to that field.

Figure 4:
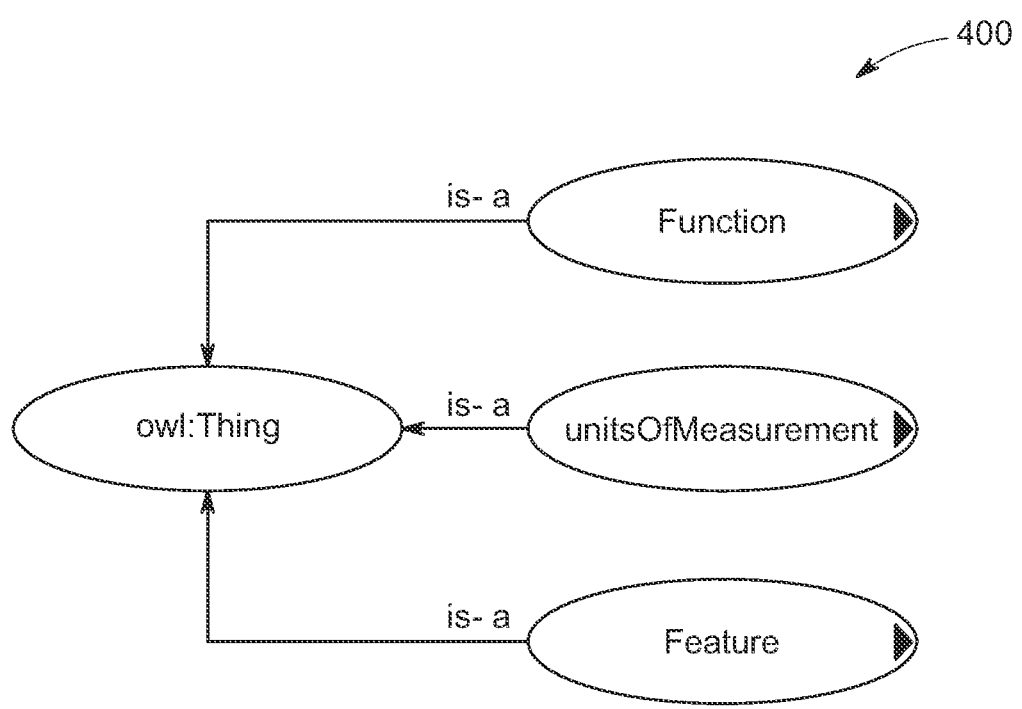
FIG. 4 illustrates logical entities of an ontology according to some embodiments.
Figure 5A:
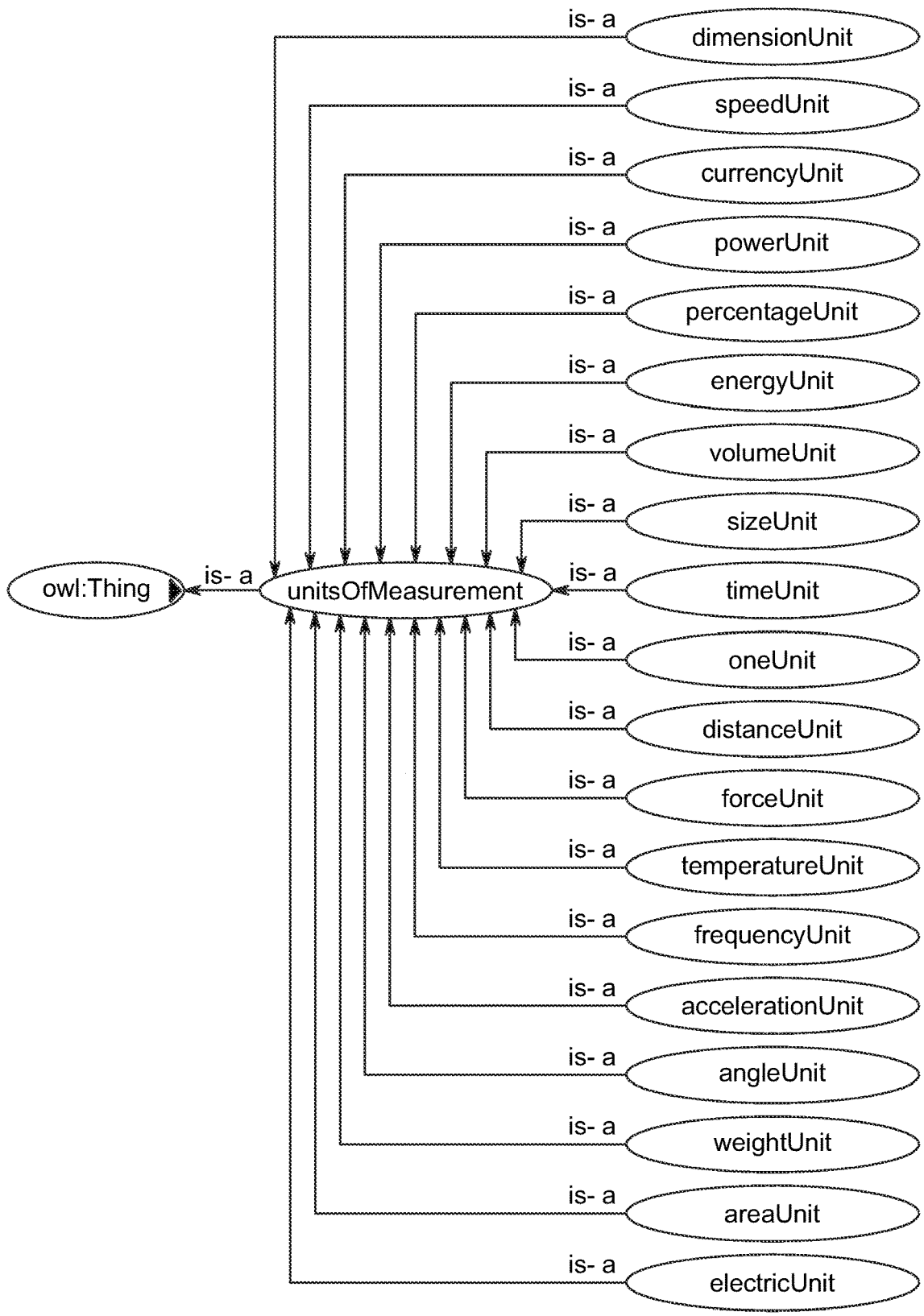
FIG. 5A illustrates examples of units of measurement logical entities of an ontology according to some embodiments.
Figure 5B:
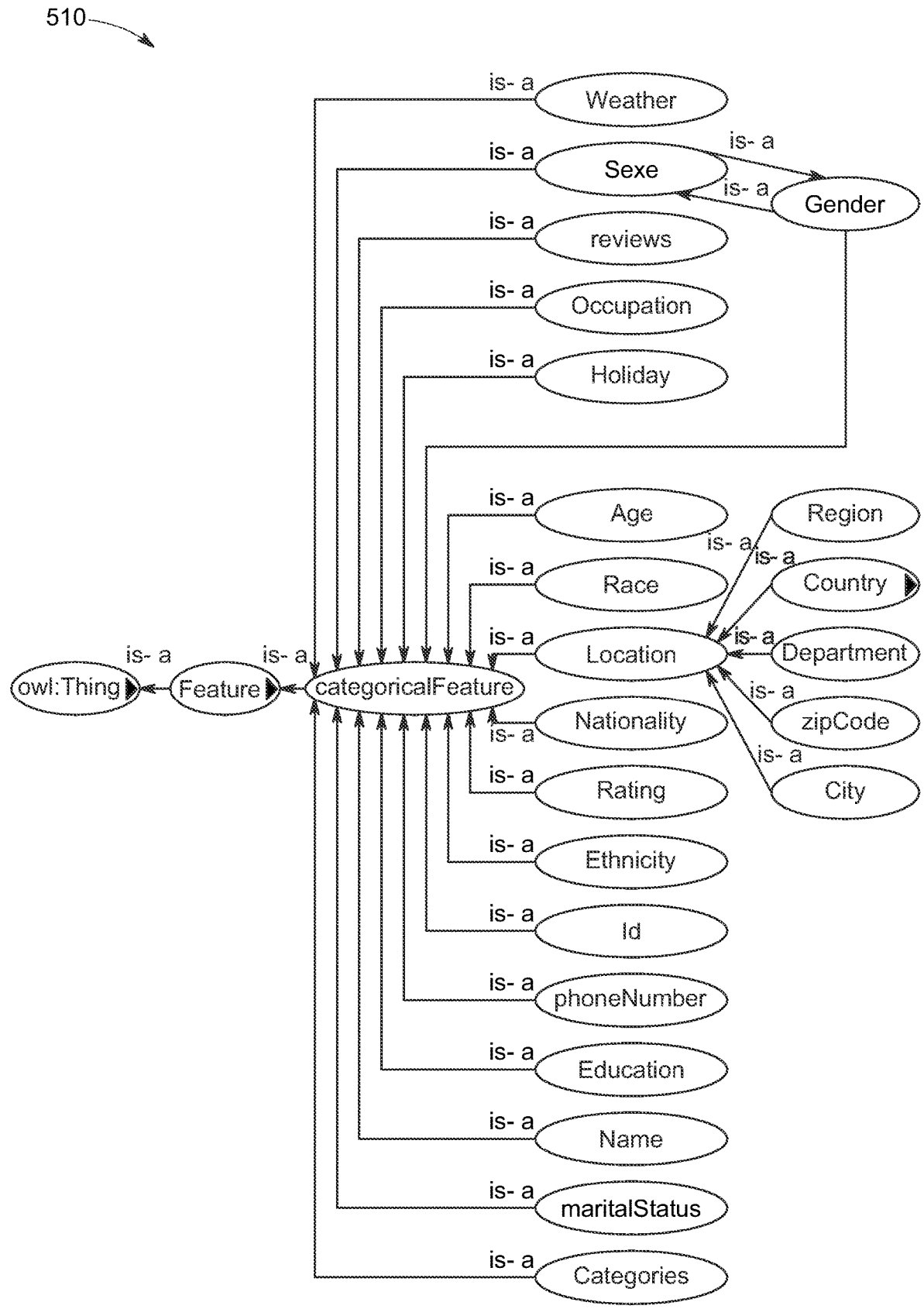
FIG. 5B illustrates examples of categorical feature logical entities of an ontology according to some embodiments.
Figure 5C:
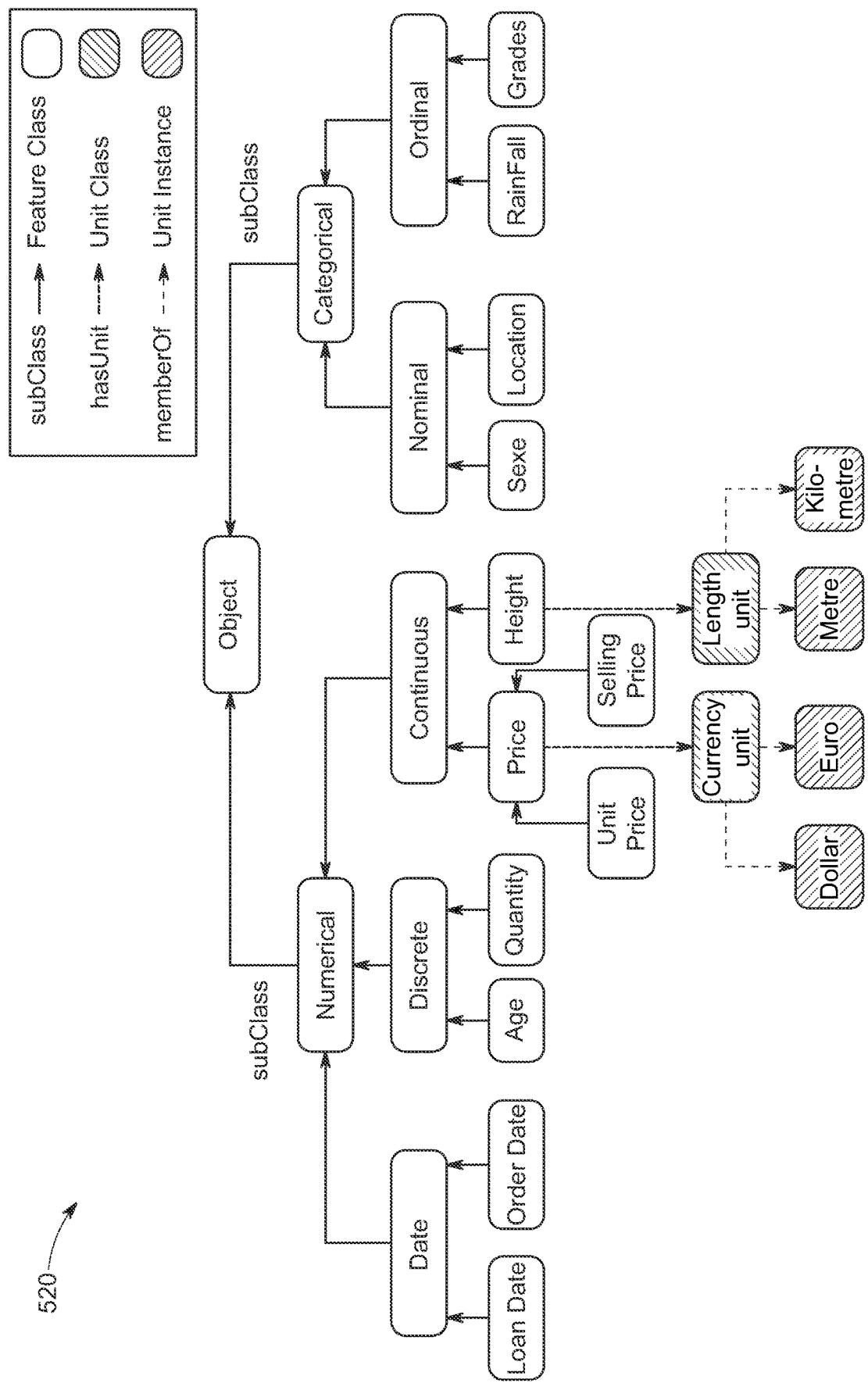
FIG. 5C is a diagram of a portion of a taxonomy according to some embodiments.

FIG. 4 shows three super-classes 400 of a taxonomy according to some embodiments. The Feature super-class may include numerical and/or categorical features, the Function super-class may include arithmetic or aggregation functions, and the unitsofMeasurement super-class may include any units of measurement. Each super-class may include a hierarchy of sub-classes. For example, FIG. 5A depicts sub-classes 500 of the unitsofMeasurement super-class. Similarly, FIG. 5B includes sub-classes 510 of the Feature super-class. FIG. 5C illustrates portion 520 of a taxonomy according to some embodiments. Portion 520 includes logical entities consisting of classes, subclasses, unit classes and unit instances, but embodiments are not limited thereto.

Returning to S320, a feature vector may correspond to a flattened representation of logical entities within a taxonomy. FIG. 6 shows flattened representation 600, in which each logical entity of a taxonomy is listed along with any sibling entities immediately below its parent logical entity. Embodiments are not limited thereto. Feature vector 650 includes a dimension for each logical entity of flattened representation 600.

At S320, and for each of the determined columns, the dimension of a feature vector that represents its super-classes and its unit are set to 1, and the other dimensions are set to 0. This process may utilize direct and/or fuzzy mappings from text names of features to logical entities and/or user intervention. The feature vectors determined at S320 are combined into a composite feature vector at S330. According to some embodiments, composite feature vector $\phi(X)$ is generated by the sum of the feature vectors generated for each feature x: $\emptyset(X) = E_{x \in X} \emptyset(x)$.

New features are generated at S340. Each new feature may be generated based on one or more of the plurality of database columns as is known in the art. The new features may be generated manually and/or by a feature generation system as described below.

Next, at S350, a feature vector is determined for each of the new features based on the taxonomy of logical entities. The feature vectors may be determined as described above with respect to S320. The feature vectors determined for the new features at S350 are combined with the last-determined composite feature vector at S360 to generate a new composite feature vector. S360 may proceed as described above with respect to the combination of feature vectors 271, 272, 273 with composite feature vector 190 to generate composite feature vector 290.

S340 through S360 may repeat to generate new features and to combine corresponding feature vectors with the current composite feature vector to generate a new composite feature vector. According to some embodiments, the composite feature vector remains the same size regardless of the number of iterations or the number of features represented thereby.

Figure 7:
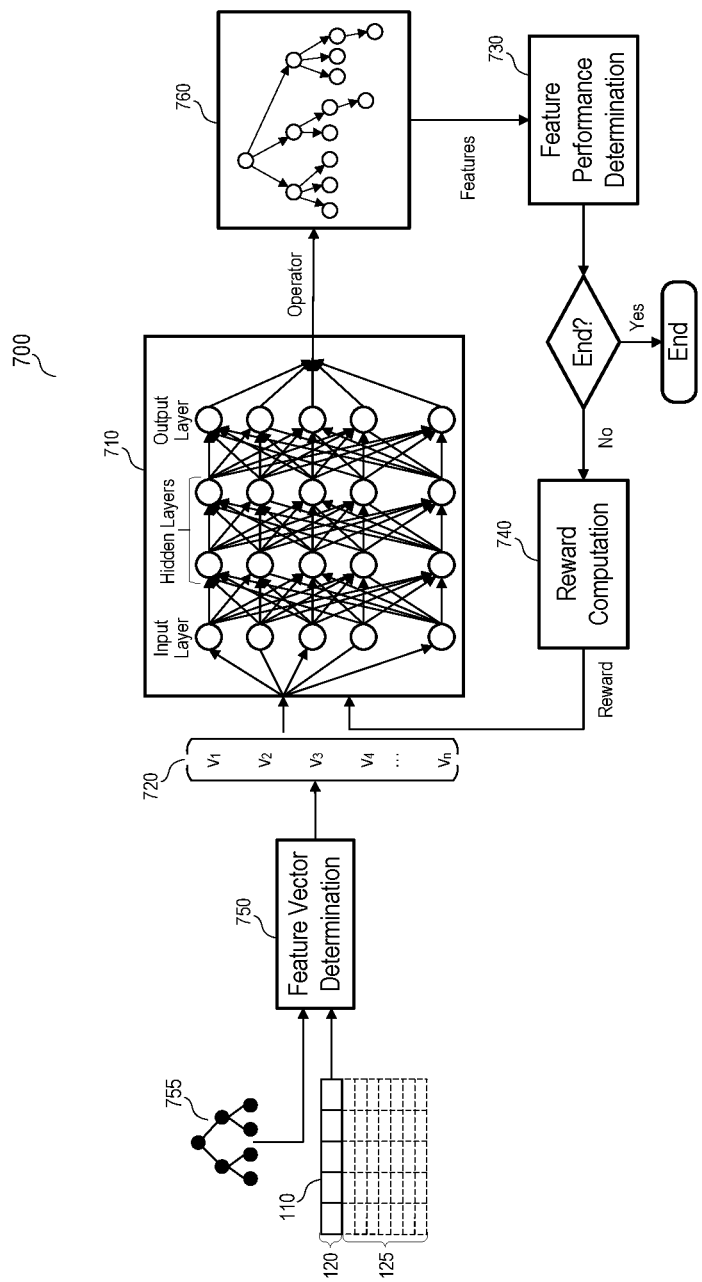
FIG. 7 is a block diagram of an architecture to determine features using a fixed-size composite feature vector representing a plurality of features according to some embodiments.

FIG. 7 is a block diagram of architecture 700 to determine features according to some embodiments. Determination of features according to some embodiments may address a predictive modeling problem consisting of a dataset, D, with raw features, $F = \{f_1, \ldots, f_n\}$, and a target vector, $\gamma$, a set of transformations, $T = \{t_1, \ldots, t_k\}$, an applicable learning algorithm L and a measure of performance m (such as F1-score). $P_L^m(F, \gamma)$ is defined as cross-validation performance using measure m for the model constructed on given data with algorithm L. Algorithm L may comprise a linear regression algorithm, a classification algorithm, or any other suitable algorithm which might or might not be implemented using a neural network. Architecture 700 may therefore be used to determine a set of features, $F^* = F_1 \cup F_2$, where $F_1 \subseteq F$ (original) and $F_2 \subseteq F_T$ (derived), to maximize the modeling accuracy for a given algorithm L and measure m, i.e., $$F^* = \mathrm{argmax}_{F_2} P_L^m(F_1 \cup F_2, y).$$

Some embodiments employ a deep Q-network method to effectively automate the process of trial and error which a human normally performs to determine a set of input features. Generally, a deep reinforcement learning agent may optimize the exploration policy on historical data. For example, deep reinforcement learning agent 710 receives, at each training step, a composite feature vector 720 representing a particular set of input features, a multi-layer neural network calculates an intermediate reward score for each possible operator that can be applied on the feature set and selects the operator that maximizes the long term reward.

The selected operator is used to generate a new set of features, component 730 determines a performance m of algorithm L when trained based on the new set of features, and component 740 determines a reward based on the performance m. Agent 710 receives the reward and the process goes on iteratively until convergence. As a result, agent 710 learns patterns of association between the semantic knowledge of feature vectors (i.e., represented by composite feature vector 720) and transformation functions effective for generating a suitable set of features for algorithm L.

Architecture 700 includes feature vector determination component 750 for generating instances of fixed-size composite feature vector 720 representing a respective plurality of features. The plurality of features may be those output to feature performance determination component 730 in an immediately-prior training iteration or features represented by other nodes of graph 760 as will be described below. Feature vector determination component 750 may generate instances of fixed-size composite feature vector 720 based on taxonomy 755 as described above with respect to process 300.

Agent 710 receives an input composite feature vector 720 and determines an operator based thereon. An operator may comprise a transformation operator or function which may be applied to one or more features to result in one or more other features. Agent 710 includes a fixed-size input layer corresponding to the fixed size of composite feature vector 720 which agent 710 is intended to receive.

Figure 8:
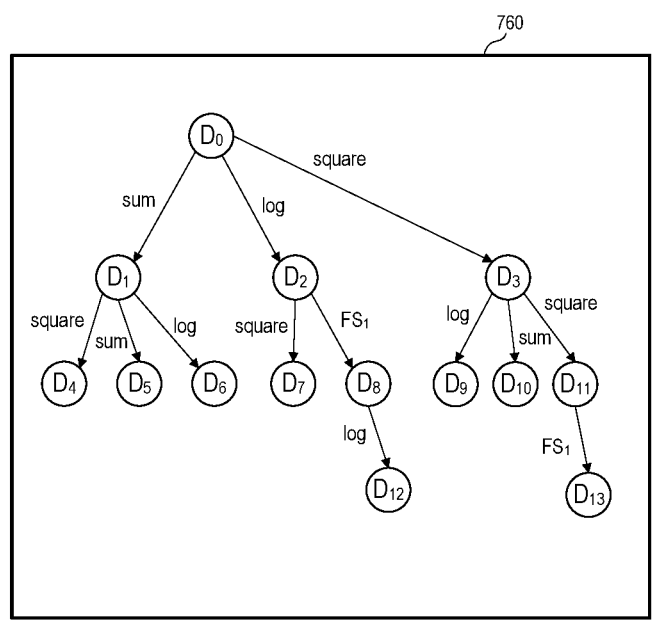
FIG. 8 is a transformation graph including nodes representing sets of features and edges representing operations according to some embodiments.

Transformation graph 760 maintains nodes generated during training of agent 710. The nodes represent different feature sets generated based on operations output by agent 710. Each node represents a set of input features, and nodes are connected via edges which describe the transformation from the features of an origin node to the features of a destination node. FIG. 8 is view of transformation graph 760 including nodes representing sets of features and edges representing operations according to some embodiments.

Transformation graph 760 is a directed acyclic tree where each node represents a state (set of features), each edge represents an action (a possible transformation operation) and each path from the root ($D_0$) to a leaf node (e.g., $D_7$) represents a feature engineering pipeline. In some embodiments, the problem of feature engineering is therefore reduced to a problem of exploring transformation graph 760 to find the best pipeline that maximizes the expected reward. For example $D_4$={$D_0$, sum($D_0$), square($D_1$)}={$D_0$, sum($D_0$), square($D_0$), square(sum($D_0$))}.

However, given the number of transformations, the complexity of traversing transformation graph 760 to find the best pipeline (i.e., set of input features) grows exponentially as the depth of the graph becomes larger. To optimize the exploration strategy, embodiments select at each iteration the best node that maximizes the expected reward. For example, at iteration $t_0$, agent 710 selects either Sum, Log, or Square to generate $D_1$, $D_2$ or $D_3$ respectively. If Sum is selected to generate $D_1$, then selection of Sum, Log, or Square at iteration $t_1$ generates either $D_4$, $D_5$ or $D_6$, respectively. Iterations continue in this manner until the best pipeline (i.e., from the root to a leaf) is determined.

The training of agent 710 includes a large number of epochs. At each epoch, the goal of agent 710 is to find the optimal pipeline starting from the root ($D_0$) and to update its parameters accordingly. Consequently, agent 710 can choose two different pipelines at two different epochs. For example, it can choose {$D_0$, $D_1$, $D_4$} in the first epoch and choose {$D_0$, $D_2$, $D_8$, $D_{12}$} in the next epoch.

Determination of an operator at each iteration uses an epsilon-greedy policy which selects the best node (i.e., node that maximizes the expected reward) with probability 1-epsilon and selects a random node with probability epsilon where epsilon is a hyperparameter. Because agent 710 may sometimes select a random operator rather than the "best" operator, agent 710 may traverse different pipelines of graph 760 at each iteration.

Feature performance determination component 730 receives a set of features based on transformation graph 760. The set of features may comprise a union of the features represented by a node of graph 760 and the features represented by each ancestor node. For example, it is assumed that node $D_0$ represents features a, b, c and node $D_2$ represents features a, b, c, log a, log b, log c. It is also assumed that a composite feature vector 720 representing features a, b, c, log a, log b, log c is input to agent 710, which outputs the operator "square" in response. This output results in addition of node $D_7$ to graph 760, representing a, b, c, log a, log b, log c, $a^2$, $b^2$, $c^2$, $(\log a)^2$, $(\log b)^2$, $(\log c)^2$. Accordingly, the set of features output to feature performance determination component 730 comprises a, b, c, log a, log b, log c, $a^2$, $b^2$, $c^2$, $(\log a)^2$, $(\log b)^2$, $(\log c)^2$.

Feature performance determination component 730 determines the performance of the set of features. The performance may be determined by training a machine learning model based on the set of features and evaluating the trained model (e.g., using test data) to determine one or more performance metrics of the trained model. The machine learning model is selected for performance of a particular desired inference, including but not limited to as a regression (e.g., predicted profit based on features derived from a Sales database table) or a classification (e.g., predicted most-popular product configuration based on features derived from a Customer database table). It may then be determined whether or not to terminate training of agent 710 based on some criteria, including but not limited to a threshold number of reward computation cycles or a performance metric.

If training is not to be terminated, reward computation component 740 determines a reward based on the performance determined by component 730. For example, reward computation component 740 may determine a reward based on whether or not a determined performance (e.g., $m_{n+1}$) of the most-recently determined features reflects an improvement over a performance (e.g., $m_n$) determined for prior a set of features.

Figure 9:
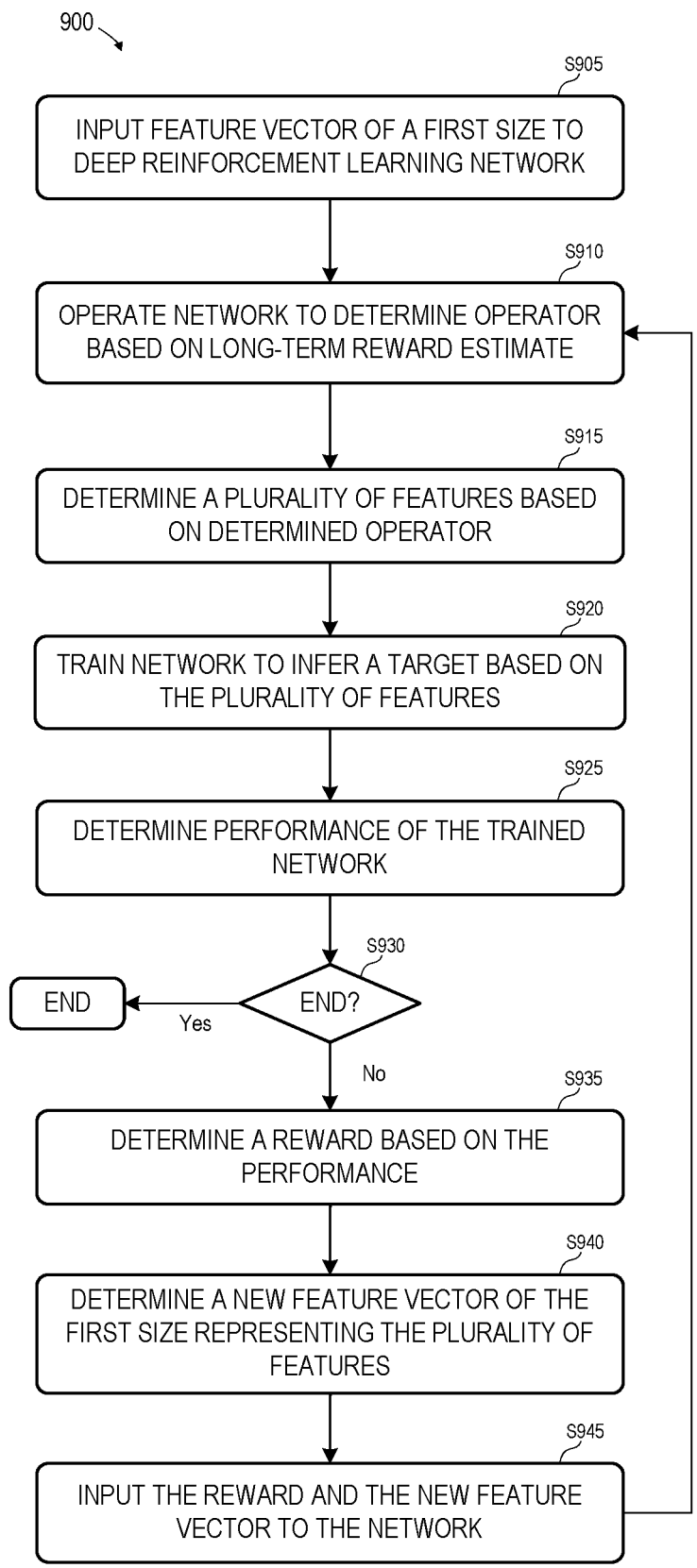
FIG. 9 is a flow diagram of a process to determine features using a fixed-size composite feature vector representing a plurality of features according to some embodiments.

FIG. 9 is a flow diagram of process 900 to determine a set of features using fixed-size composite feature vectors according to some embodiments. Process 900 may be performed by components of an architecture such as architecture 700 of FIG. 7, but embodiments are not limited thereto.

Initially, at S905, a feature vector of a first size is input to a deep reinforcement learning network. As described above, the feature vector may comprise a composite feature vector representing a plurality of features and generated based on individual feature vectors representing the semantics of respective ones of the plurality of features.

The network is operated to determine an operator based on a long-term reward estimate at S910. The deep reinforcement learning network may model a Markovian Decision Process (MDP) according to some embodiments. MDP provides a mathematical framework for modeling decision making comprises a finite or infinite set of states, $S=\{s_i\}$; a finite set of actions, $A=\{\alpha_i\}$; a state transition function, $T(s, \alpha, s')$, specifying the next state s' given the current state s and action $\alpha$; a reward function $R(s, \alpha, s')$ specifying the reward given to the reinforcement learning agent for choosing an action $\alpha$ in a state s and transitioning to a new state s'; and a policy $\pi: S \rightarrow A$ defining a mapping from states to actions.

A state $s_i$ in the present example corresponds to a composite feature vector $\phi(X)$ provided to the deep reinforcement learning network and the set of actions A corresponds to the set of operators represented in the output layer of the deep reinforcement learning network (i.e., arithmetic and aggregation functions such as, for example, Log, Square, Square Root, Product, ZScore, Aggregation (using Min, Max, Mean, Count, Std, mode, Sum), Temporal window aggregate, k-term frequency, Addition, Difference, Division, multiplication, Sin, Cos, Tan H). The deep reinforcement learning network may attempt to determine an action (i.e., operator) which maximizes an estimate of a long-term cumulative reward, defined as:

$$Q^*(s, a) = \max_\pi E[r_t + \gamma r_{t+1} + \gamma^2 r_{t+2} + \ldots \mid s_t = s, a_t = a, \pi],$$

where function $Q^*$ represents the maximum sum of rewards $r_t$ discounted by factor $\gamma$ at each time step. The Q-function may be induced by the deep reinforcement learning network and may be parameterized as $Q(s, \alpha; \theta_i)$, where $\theta_i$ are the parameters (i.e., weights) of the network at training iteration i.

After calculating the Q-values, the network may apply an epsilon greedy policy to determine either the operator associated with a maximum reward or a random operator based on a certain input probability.

A plurality of features are determined based on the operator at S915. In some embodiments, transformation graph 760 may provide a transformation to a new state (i.e., set of features) based on the received operator. The new state may include all of the features of the prior state (e.g., a, b, c) and new features (e.g., $a^2$, $b^2$, $c^2$) transformed from the prior state.

Figure 10:
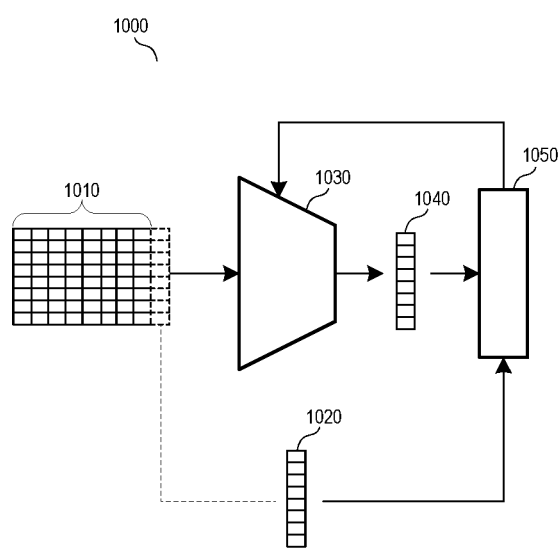
FIG. 10 is a block diagram of an architecture to train a model to output a target based on a set of features and training data.

Next, at S920, a network is trained to infer a target based on the plurality of features. The network is a network which is intended to perform the task for which input features are being determined by process 900. For example, process 900 may be intended to generate features based on raw features of a Sales table which are to be input to a regression model to infer a Profit target. FIG. 10 illustrates training architecture 1000 which may be used in some embodiments at S920.

Model 1030 may comprise a regression model implemented using a neural network, a set of linear equations or in any other suitable manner. Columns 1010 include training data, where each of columns 1010 includes values corresponding to one of the features of the new state. For example, if the new state consists of features (a, b, c, $a^2$, $b^2$, $c^2$), columns 1010 include a column of data values for each of features a, b, c as well as a column of data values for each of features $a^2$, $b^2$, $c^2$, where the data values of the latter columns are equal to the square of the data values of the corresponding former columns. Column 1020 includes a ground truth value of the Profit target for each row of columns 1010.

One training iteration according to some embodiments may include inputting columns 1010 to model 1030, operating model 1030 to output resulting inferred values 1040 for each record of columns 1010, operating loss layer 1050 to evaluate a loss function based on output inferred values 1040 and known ground truth data column 1020, and modifying model 1030 based on the evaluation. Iterations may continue until a threshold number of iterations have been performed, for example.

Performance of the trained network is determined at S925. Any one or more performance metrics may be determined at S925. Performance may be determined by evaluating the output of the trained network in response to input data with respect to known ground truths associated with the input data.

Figure 11:
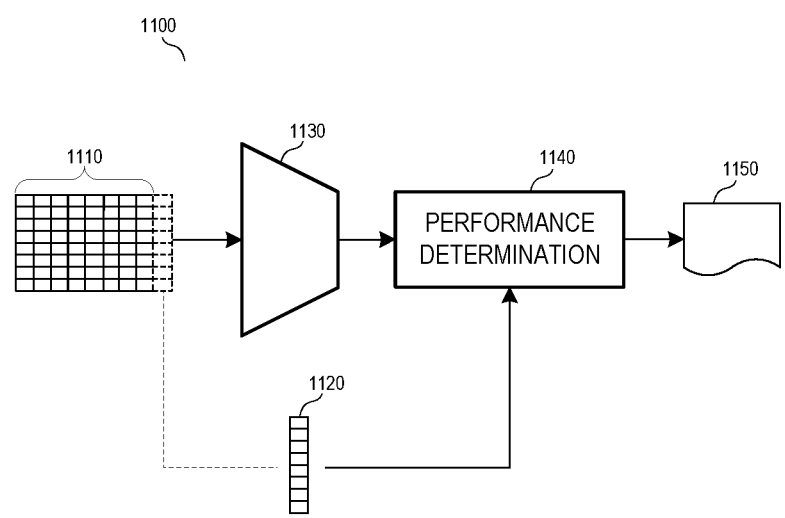
FIG. 11 is a block diagram of an architecture to determine model performance based on a set of features and test data.

FIG. 11 illustrates system 1100 to determine performance of a trained network according to some embodiments. Columns 1110 include test data associated with the same features represented by columns 1010 of training data. Column 1120 includes ground truth data values (i.e., of a Profit target) associated with each row of columns 1110.

Trained model 1130 receives columns 1110 and outputs an inferred value for each row of columns 1110 to performance determination component 1140. Performance determination component 1140 compares the received values to corresponding values of column 1120 to determine one or more performance metrics (e.g., accuracy, precision, recall) 1150.

At S930, it is determined whether to end process 900. The determination may be based on an amount of time elapsed, an amount of processing power used, a number of executed iterations of S910 or any suitable key performance indicators. It will be assumed that the determination at S930 is negative and flow proceeds to S935.

An intermediate reward is determined at S935 based on the performance determined at S925. In some embodiments, the intermediate reward is determined based on whether or not the performance has improved since a last determination of performance based on a last-determined plurality of features. For example, the magnitude of the reward may be related to a size of the difference between the two performances, and a sign of the reward may be positive if the current performance is better than the last-determined performance and negative otherwise.

A new feature vector is determined at S940. The new feature vector may represent the last-determined features (e.g., a, b, c, $a^2$, $b^2$, $c^2$), and may be generated in view of a semantic ontology as described above with respect to process 300. For example, if the original feature vector input at S905 represented features a, b and c, then S940 may comprise combining the original feature vector with individual feature vectors representing each of features $a^2$, $b^2$, $c^2$.

The following describes determination of a feature vector representing a feature which itself is a combination of other features. For example, if a new feature (e.g., Z) is generated using the Sum or Product of two other features (e.g., X and Y), feature vector determination component 750 may determine whether feature Z is equivalent to a concept in taxonomy 755. If so, feature vector determination component 750 determines a feature vector for feature Z in a same manner as in the case of features represented in taxonomy 755. In a case that Z=Distance (X)÷Time (Y), component 750 determines that taxonomy 755 includes the concept Speed which is equal to distance divided by time and therefore identifies the feature Z as equivalent to the concept Speed. In another example, Z=unitPrice (X)*QuantitySold (Y), which is identified in taxonomy 755 as the Total Sale Price concept.

If no concept is determined as equivalent to the new feature Z, its units of measurement are used to identify any correspondence with a concept of taxonomy 755. For example, given $Z=m*c^2$ and a corresponding unit of measurement $kg*m^2/s^2$, it is determined that no concept of taxonomy 755 is equivalent thereto. However, taxonomy 755 includes the concept of Kinetic Energy which is correlated to the product of the mass of an object and the square of its velocity (i.e. kinetic energy=½ $m*v^2$). Since the unit of Kinetic Energy is $kg*m^2/s^2$, feature vector determination component 750 determines that feature Z is related to the concept Energy and generates a feature vector based on the logical relationships of the concept Energy.

If the new feature is not determined to be equivalent or correspond to a known concept, feature vector determination component 750 may generate a feature vector including 1 in the entries corresponding to 'dimensions' and 'numerical' and 0 in the other entries.

According to some embodiments, the new feature vector may represent features other than the last-determined features. For example, if the last features were represented by node $D_7$ of graph 760, feature vector determination component 750 may determine, in a process of trial and error, to input a feature vector representing the features associated with node $D_2$.

Flow then returns to S910 and continues as described above until it is determined at S930 to end process 900. At that point, the deep reinforcement learning network is considered trained.

The training described in process 900 requires a dataset of experiences $D_1=e_1, \ldots, e_t$, where every experience is described as a tuple $e_t=(s_t, \alpha_t, r_t, s_{t+1})$. The Q-function can be induced by applying Q-learning updates over mini-batches of experience MB={(s, α, r, s')~U (D)} drawn uniformly from dataset D. A Q-learning update at iteration i may be defined as the loss function:

$$L_i(\theta_i) = E_{MB}\left[\left(r + \gamma \max_{a'} Q(s', a'; \overline{\theta}_i) - Q(s, a; \theta_i)\right)^2\right],$$

where $\theta_i$ are the parameters of the neural network at iteration i, and $\overline{\theta}_i$ are the target parameters of the neural net at iteration i. The latter parameters are updated every C steps. This process may be implemented using the learning algorithm Deep Q-Learning with Experience Replay.

The thusly-trained deep reinforcement learning network may be used to determine features based on an input set of raw features. For example, a composite feature vector is determined based on the raw features and input to the trained network. The trained network outputs an operator which is used to generate new features based on the input features and a new composite feature vector is determined based on all the features. Iterations may continue to generate more and more features to increase the accuracy of the model which will be trained based on these features. However, at some point it is desirable to cease the iterations due to the increase in processing time required to train and operate a model as the number of features increase. The final set of determined features may then be output to a user as a recommendation and/or used to train a suitable model.

Figure 12:
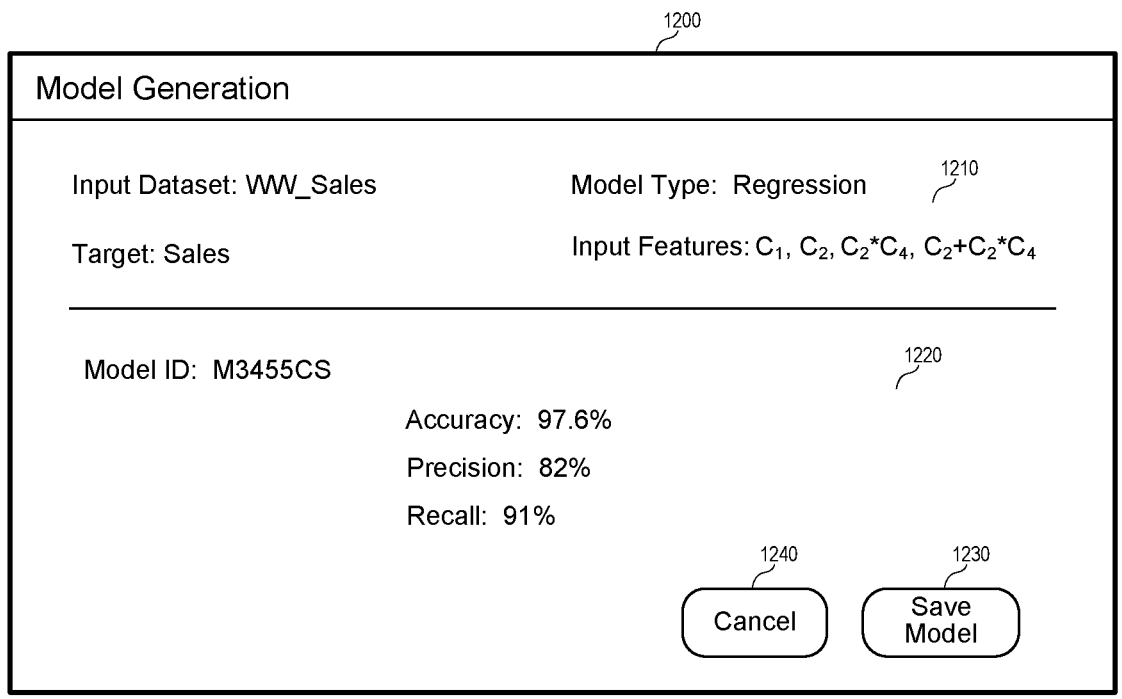
FIG. 12 is an outward view of an interface presenting selected input features of a trained model according to some embodiments.

FIG. 12 illustrates interface 1200 presenting information associated with a model trained using features generated according to some embodiments. User interface 1200 may be presented by a user device executing a client application (e.g., a Web application) which provides definition and training of machine learning models.

User interface 1200 includes area 1210 presenting various configuration parameters of a trained model. The configuration parameters include an input dataset (e.g., an OLAP cube), a type of model (i.e., Regression), and a training target (i.e., Sales). Area 1210 also specifies input features which were generated based on raw features of the input dataset using processes 300 and 900 described above.

Area 1220 provides information regarding a model which has been trained based on the configuration parameters of area 1210. In the illustrated example, area 1220 specifies an identifier of the trained model and determined accuracy, precision and recall values. Embodiments are not limited to the information of area 1220. A user may review the information provided in area 1220 to determine whether to save the trained model for use in generating future inferences (e.g., via Save Model control 1230) or to discard the trained model (e.g., via Cancel control 1240).

Figure 13:
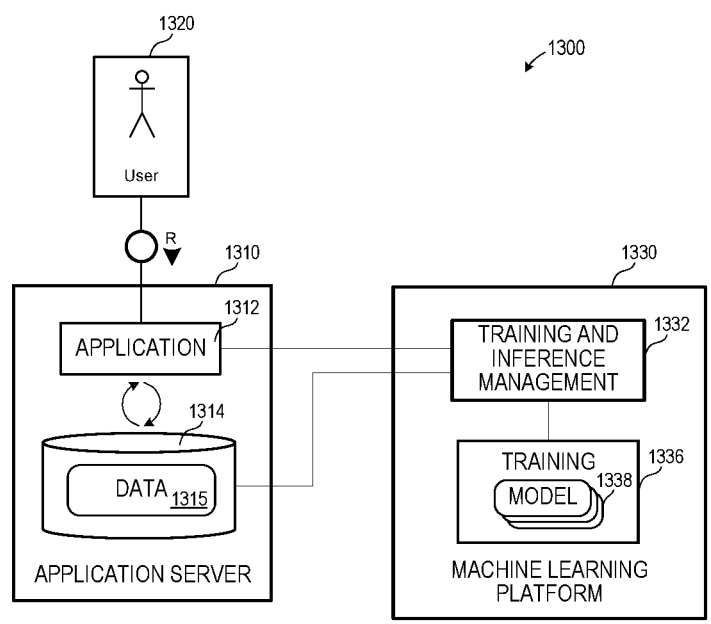
FIG. 13 illustrates a system to provide trained models to applications according to some embodiments.

FIG. 13 illustrates system 1300 to provide model training to applications according to some embodiments. Application server 1310 may comprise an on-premise or cloud-based server providing an execution platform and services to applications such as application 1312. Application 1312 may comprise program code executable by a processing unit to provide functions to users such as user 1320 based on logic and on data 1315 stored in data store 1314. Data 1315 may be column-based, row-based, object data or any other type of data that is or becomes known. Data store 1314 may comprise any suitable storage system such as a database system, which may be partially or fully remote from application server 1310, and may be distributed as is known in the art.

According to some embodiments, user 1320 may interact with application 1312 (e.g., via a Web browser executing a client application associated with application 1312) to request a trained model based on data of data 1315. The data may comprise data aggregated across dimensions of an OLAP cube. In response to the request, application 1312 may call training and inference management component 1332 of machine learning platform 1330 to request training of a corresponding model according to some embodiments.

Based on the request, training, and inference management component 1332 may receive the specified data from data 1315 and instruct training component 1336 to train a model 1338 based on dimension-reduced training data as described herein. Application 1312 may then use the trained model to generate inferences based on input data selected by user 1320.

In some embodiments, application 1312 and training and inference management component 1332 may comprise a single system, and/or application server 1310 and machine learning platform 1330 may comprise a single system. In some embodiments, machine learning platform 1330 supports model training and inference for applications other than application 1312 and/or application servers other than application server 1310.

Figure 14:
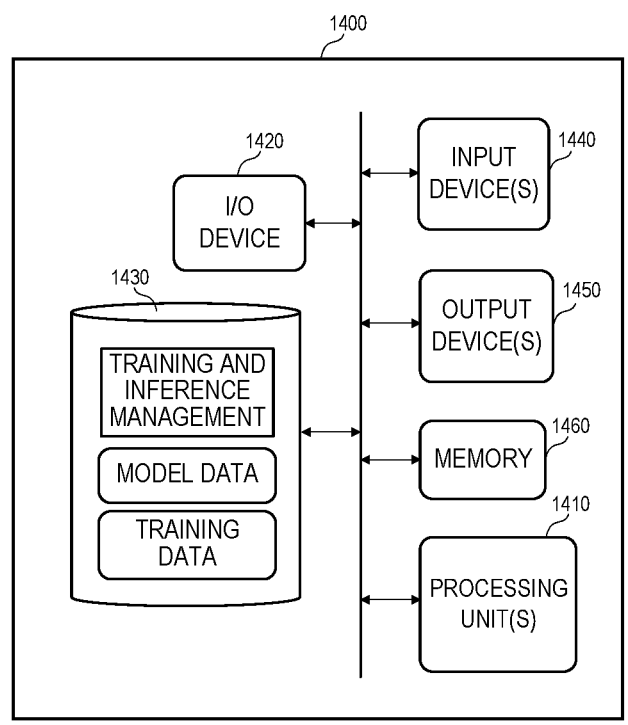
FIG. 14 is a block diagram of a hardware system for providing trained models according to some embodiments.

FIG. 14 is a block diagram of a hardware system providing model training according to some embodiments. Hardware system 1400 may comprise a general-purpose computing apparatus and may execute program code to perform any of the functions described herein. Hardware system 1400 may be implemented by a distributed cloud-based server and may comprise an implementation of machine learning platform 1330 in some embodiments. Hardware system 1400 may include other unshown elements according to some embodiments.

Hardware system 1400 includes processing unit(s) 1410 operatively coupled to I/O device 1420, data storage device 1430, one or more input devices 1440, one or more output devices 1450 and memory 1460. I/O device 1420 may facilitate communication with external devices, such as an external network, the cloud, or a data storage device. Input device(s) 1440 may comprise, for example, a keyboard, a keypad, a mouse or other pointing device, a microphone, knob or a switch, an infra-red (IR) port, a docking station, and/or a touch screen. Input device(s) 1440 may be used, for example, to enter information into hardware system 1400.

Output device(s) 1450 may comprise, for example, a display (e.g., a display screen) a speaker, and/or a printer.

Data storage device 1430 may comprise any appropriate persistent storage device, including combinations of magnetic storage devices (e.g., magnetic tape, hard disk drives and flash memory), optical storage devices, Read Only Memory (ROM) devices, and RAM devices, while memory 1460 may comprise a RAM device.

Data storage device 1430 stores program code executed by processing unit(s) 1410 to cause system 1400 to implement any of the components and execute any one or more of the processes described herein. Embodiments are not limited to execution of these processes by a single computing device. Data storage device 1430 may also store data and other program code for providing additional functionality and/or which are necessary for operation of hardware system 1400, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
   a memory storing processor-executable program code; and
   at least one processing unit to execute the processor-executable program code to cause the system to:
   determine a plurality of database columns of one or more database tables;
   for each of the plurality of database columns, determine a feature vector based on a taxonomy of logical entities;
   combine the determined feature vectors of each of the plurality of database columns into a composite feature vector;
   determine an operator based on the composite feature vector; and
   determine a feature based on the operator and the plurality of database columns,
   wherein each entry of each of the feature vectors corresponds to a respective one of the logical entities, and
   wherein combination of the determined feature vectors comprises determination, for each one of the logical entities, of a composite value based on the entry of each of the feature vectors which corresponds to the logical entity.

2. A system according to claim 1, the at least one processing unit to execute the processor-executable program code to cause the system to:
   determine a second feature vector based on the determined feature;
   combine the second feature vector with the composite feature vector to generate a second composite feature vector;
   determine a second operator based on the second composite feature vector; and
   determine a third feature based on the second operator.

3. A system according to claim 2, wherein the determined feature vectors, the composite feature vector, the second feature vector and the second composite feature vector are a same size.

4. A system according to claim 3, the at least one processing unit to execute the processor-executable program code to cause the system to:
   determine the operator by inputting the composite feature vector to a deep reinforcement learning network; and
   determine the second operator by inputting the second composite feature vector to the deep reinforcement learning network.

5. A system according to claim 1, wherein the determined feature vectors and the composite feature vector are a same size.

6. A method comprising:
   determining a plurality of features of one or more database tables;
   for each of the plurality of features, determining a feature vector based on a taxonomy of logical entities;
   combining the determined feature vectors of each of the plurality of features into a composite feature vector;
   determining an operator based on the composite feature vector; and
   determining a new feature based on the operator and the plurality of features,
   wherein each entry of each of the feature vectors corresponds to a respective one of the logical entities, and
   wherein combining the determined feature vectors comprises determining, for each one of the logical entities, a composite value based on the entry of each of the feature vectors which corresponds to the logical entity.

7. A method according to claim 6, further comprising:
   determining a second feature vector based on the new feature;
   combining the second feature vector with the composite feature vector to generate a second composite feature vector;
   determining a second operator based on the second composite feature vector; and
   determining a third feature based on the second operator.

8. A method according to claim 7, wherein the determined feature vectors, the composite feature vector, the second feature vector and the second composite feature vector are a same size.

9. A method according to claim 8, further comprising:
   determining the operator by inputting the composite feature vector to a deep reinforcement learning network; and
   determining the second operator by inputting the second composite feature vector to the deep reinforcement learning network.

10. A method according to claim 6, wherein the determined feature vectors and the composite feature vector are a same size.

11. A non-transitory medium storing executable program code executable by at least one processing unit of a computing system to cause the computing system to:

determine a plurality of features, each feature associated with a database column;

for each of the plurality of features, determine a feature vector based on a taxonomy of logical entities;

combine the determined feature vectors into a composite feature vector;

determine an operator based on the composite feature vector; and determine a feature based on the operator, wherein each entry of each of the feature vectors corresponds to a respective one of the logical entities, and wherein combination of the determined feature vectors comprises determination, for each one of the logical entities, of a composite value based on the entry of each of the feature vectors which corresponds to the logical entity.

12. A medium according to claim 11, the program code executable by at least one processing unit of a computing system to cause the computing system to:

determine a second feature vector based on the determined feature;

combine the second feature vector with the composite feature vector to generate a second composite feature vector;

determine a second operator based on the second composite feature vector; and determine a third feature based on the second operator.

13. A medium according to claim 12, wherein the determined feature vectors, the composite feature vector, the second feature vector and the second composite feature vector are a same size.

14. A medium according to claim 13, the program code executable by at least one processing unit of a computing system to cause the computing system to:

determine the operator by inputting the composite feature vector to a deep reinforcement learning network; and determine the second operator by inputting the second composite feature vector to the deep reinforcement learning network.

15. A medium according to claim 11, wherein the determined feature vectors and the composite feature vector are a same size.

* * * * *